United States Patent
Baden

(10) Patent No.: US 7,787,463 B2
(45) Date of Patent: Aug. 31, 2010

(54) CONTENT AWARE APPARATUS AND METHOD

(75) Inventor: Eric A. Baden, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 1021 days.

(21) Appl. No.: 11/407,279

(22) Filed: Apr. 20, 2006

(65) Prior Publication Data
US 2007/0171838 A1 Jul. 26, 2007

Related U.S. Application Data

(60) Provisional application No. 60/762,113, filed on Jan. 26, 2006.

(51) Int. Cl.
*H04L 12/28* (2006.01)
(52) U.S. Cl. .................................................. 370/392
(58) Field of Classification Search ................. 370/392
See application file for complete search history.

(56) References Cited

U.S. PATENT DOCUMENTS

| | | | | |
|---|---|---|---|---|
| 4,470,109 A * | 9/1984 | McNally ..................... | 710/100 |
| 4,680,760 A * | 7/1987 | Giles et al. ................. | 714/718 |
| 4,745,559 A * | 5/1988 | Willis et al. ................. | 705/37 |
| 4,851,834 A * | 7/1989 | Stockebrand et al. ....... | 345/554 |
| 4,894,799 A * | 1/1990 | Hanawa et al. ............ | 365/49.17 |
| 5,045,996 A * | 9/1991 | Barth et al. ................. | 711/143 |
| 5,097,469 A * | 3/1992 | Douglas ..................... | 714/712 |
| 5,373,290 A * | 12/1994 | Lempel et al. .............. | 341/51 |
| 5,940,376 A * | 8/1999 | Yanacek et al. ............. | 370/250 |
| 6,298,398 B1 * | 10/2001 | Elliott et al. ................ | 710/30 |
| 6,483,812 B1 * | 11/2002 | Prorock ..................... | 370/252 |
| 6,499,066 B1 * | 12/2002 | Frazier ....................... | 710/5 |
| 6,556,199 B1 * | 4/2003 | Fang et al. ................. | 345/424 |
| 6,658,002 B1 * | 12/2003 | Ross et al. .................. | 370/392 |
| 6,697,276 B1 * | 2/2004 | Pereira et al. .............. | 365/49.17 |
| 6,700,809 B1 * | 3/2004 | Ng et al. .................... | 365/49.1 |
| 6,757,779 B1 * | 6/2004 | Nataraj et al. .............. | 711/108 |
| 6,876,559 B1 * | 4/2005 | Rathnavelu et al. ........ | 365/49.1 |
| 6,950,446 B2 * | 9/2005 | McClary et al. ............ | 370/503 |
| 6,972,978 B1 * | 12/2005 | Miller et al. ............... | 365/49.16 |
| 6,975,592 B1 * | 12/2005 | Seddigh et al. ............. | 370/230 |
| 6,985,492 B1 * | 1/2006 | Thi et al. .................... | 370/429 |
| 7,072,347 B2 * | 7/2006 | Calvignac et al. ......... | 370/395.71 |
| 7,281,085 B1 * | 10/2007 | Garg et al. .................. | 711/108 |
| 7,486,678 B1 * | 2/2009 | Devanagondi et al. ..... | 370/394 |
| 2002/0129198 A1 * | 9/2002 | Nataraj et al. .............. | 711/108 |
| 2002/0196796 A1 * | 12/2002 | Ambe et al. ................ | 370/401 |
| 2003/0223364 A1 * | 12/2003 | Yu et al. ..................... | 370/230.1 |
| 2004/0090978 A1 * | 5/2004 | Tsukidate ................... | 370/431 |

(Continued)

*Primary Examiner*—Kevin C Harper

(57) ABSTRACT

An example network device includes a processor that is configured to apply specific fields from a packet to an associated memory device and comparing means for comparing input to the memory device with entries in the memory device. The example network device is configured to enable selection of bits, by the memory device, that are required to match exactly with bits from the input to the memory device. The specific fields include a plurality of fields some of which include multiple field values and definitions. An input bit map field of one of the plurality of fields is used to provide an additional global mask that is ANDed to associated masks in selected entries in the memory device thereby enabling the memory device to output an OR of the data in the selected entries and thereby allowing multiple ports to share a rule within a memory device entry.

21 Claims, 5 Drawing Sheets

U.S. PATENT DOCUMENTS

2004/0233851 A1* 11/2004 Baldwin et al. ............. 370/241
2004/0258043 A1* 12/2004 Engbersen et al. .......... 370/351
2005/0135399 A1* 6/2005 Baden et al. ................ 370/428
2005/0210260 A1* 9/2005 Venkatesan et al. ......... 713/180
2006/0280192 A1* 12/2006 Desanti ...................... 370/409
2007/0115966 A1* 5/2007 Tzeng ........................ 370/389

* cited by examiner

CONTENT AWARE APPARATUS AND METHOD

BACKGROUND OF THE INVENTION

1. Field of the Invention

The present invention relates to a network device in a packet switched network and more particularly to a system and method of classifying and filtering packets and thereafter determining appropriate actions for processing the packets.

2. Description of the Related Art

A packet switched network may include one or more network devices, such as an Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

As packets enter the device from multiple ports, they are forwarded to the ingress module where switching and other processing is performed on the packets. Thereafter, the packets are transmitted to one or more destination ports through the MMU and the egress module. According to a current switching system architecture, when the packet enters the switching device, a fast filter processor examines the packet and status information associated with the packet, among others, to identify various outcomes for processing the packet. For example, one of the outcomes may indicate that the packet should be dropped and another outcome may indicate that the packet should be sent to a specific interface. In one implementation, the fast filter processor includes up to 16 predefined masks which are used to select bytes of the incoming packet. The device includes a meter mechanism for measuring how much packet data per a predefined unit of time is entering the device. The results from the metering mechanism may affect the outcome from the fast filter processor.

However, current implementations include one fast filter processor per chip. As such, the fast filter processor is difficult to scale to higher bandwidths and does not classify and/or filter packets across ports. The searching mechanisms of current fast filter processors also do not scale and, as such, will not hold up under increased bandwidth requirements of future devices with multiple 10 GE ports. Additionally, current implementations of the fast filter processor provide for limited memory resources, wherein a separate memory entry is needed for each port. Furthermore, the current fast filter processor performs a binary search on each packet. Thus, the current fast filter processor would take approximately 8 clock cycles for each lookup. Furthermore, some applications might require filtering on bits and/or fields that are further in the packet then the 80 bytes that is used by current fast filter processors. The current fast filter processor is not flexible in the selection of bits with which to filter.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
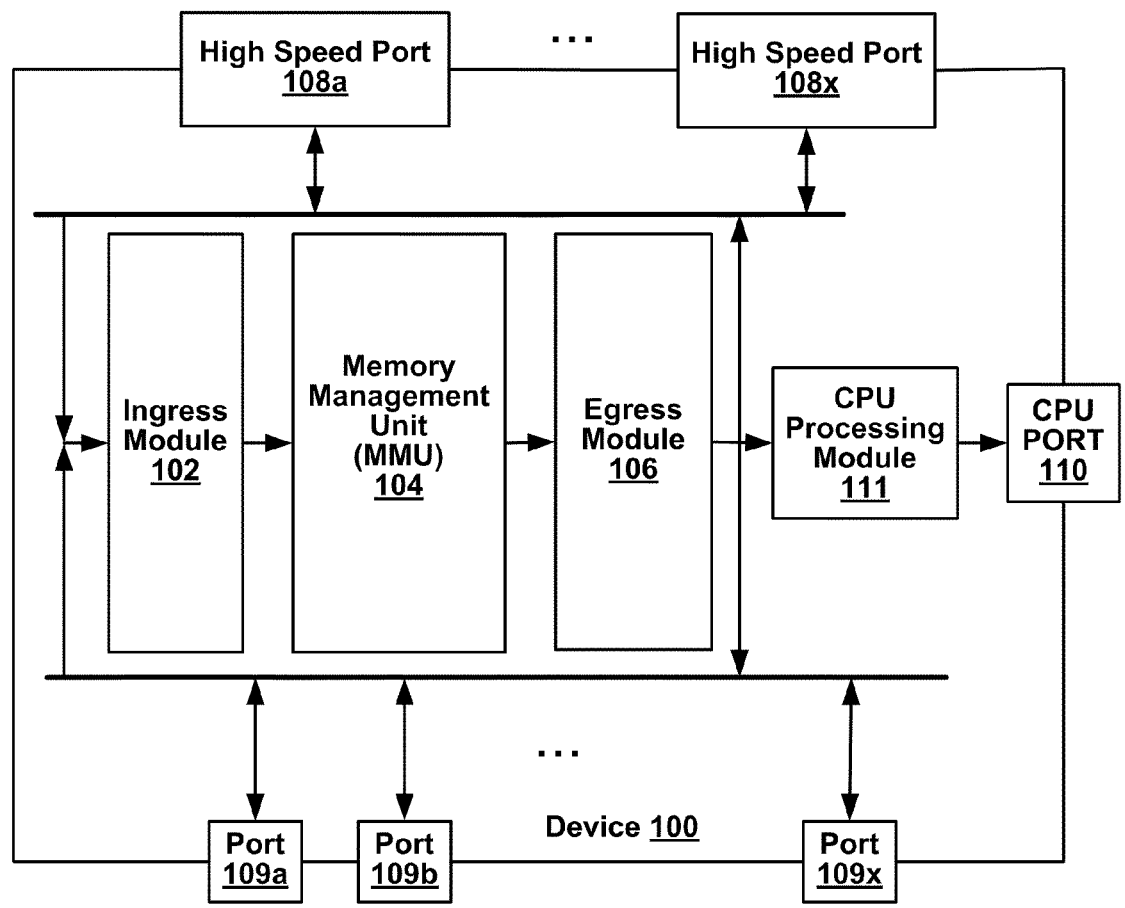
FIG. 1 illustrates a network device in which an embodiment of the present invention may be implemented.

FIG. 1 illustrates a network device, such as a switching chip, in which an embodiment the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 uses multiple cycles for processing instructions generated by that module. Device 100 implements a pipelined approach to process incoming packets. The device 100 has the ability of the pipeline to process, according to one embodiment, one packet every clock cycle. According to one embodiment of the invention, the device 100 includes a 133.33MHz core clock. This means that the device 100 architecture is capable of processing 133.33M packets/sec.

Device 100 may also include one or more internal fabric high speed ports, for example a HiGig™, high speed port 108a-108x, one or more external Ethernet ports 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple inter-connected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports 109a-109x. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global a trunk group identifier (TGID). According to an embodiment, device 100 can support up to 128 trunk ports, with up to 8 members per trunk port, and up to 29 external physical ports. Destination ports 109a-109x on device 100 may be physical external Ethernet ports or trunk ports. If a destination port is a trunk port, device 100 dynamically selects a physical external Ethernet port in the trunk by using a hash to select a member port. As explained in more detail below, the dynamic selection enables device 100 to allow for dynamic load sharing between ports in a trunk.

Once a packet enters device 100 on a source port 109a-109x, the packet is transmitted to ingress module 102 for processing. Packets may enter device 100 from a XBOD or a GBOD. The XBOD is a block that has one 10GE/12G MAC and supports packets from high speed ports 108a-108x. The GBOD is a block that has 12 10/100/1G MAC and supports packets from ports 109a-109x.

Figure 2:
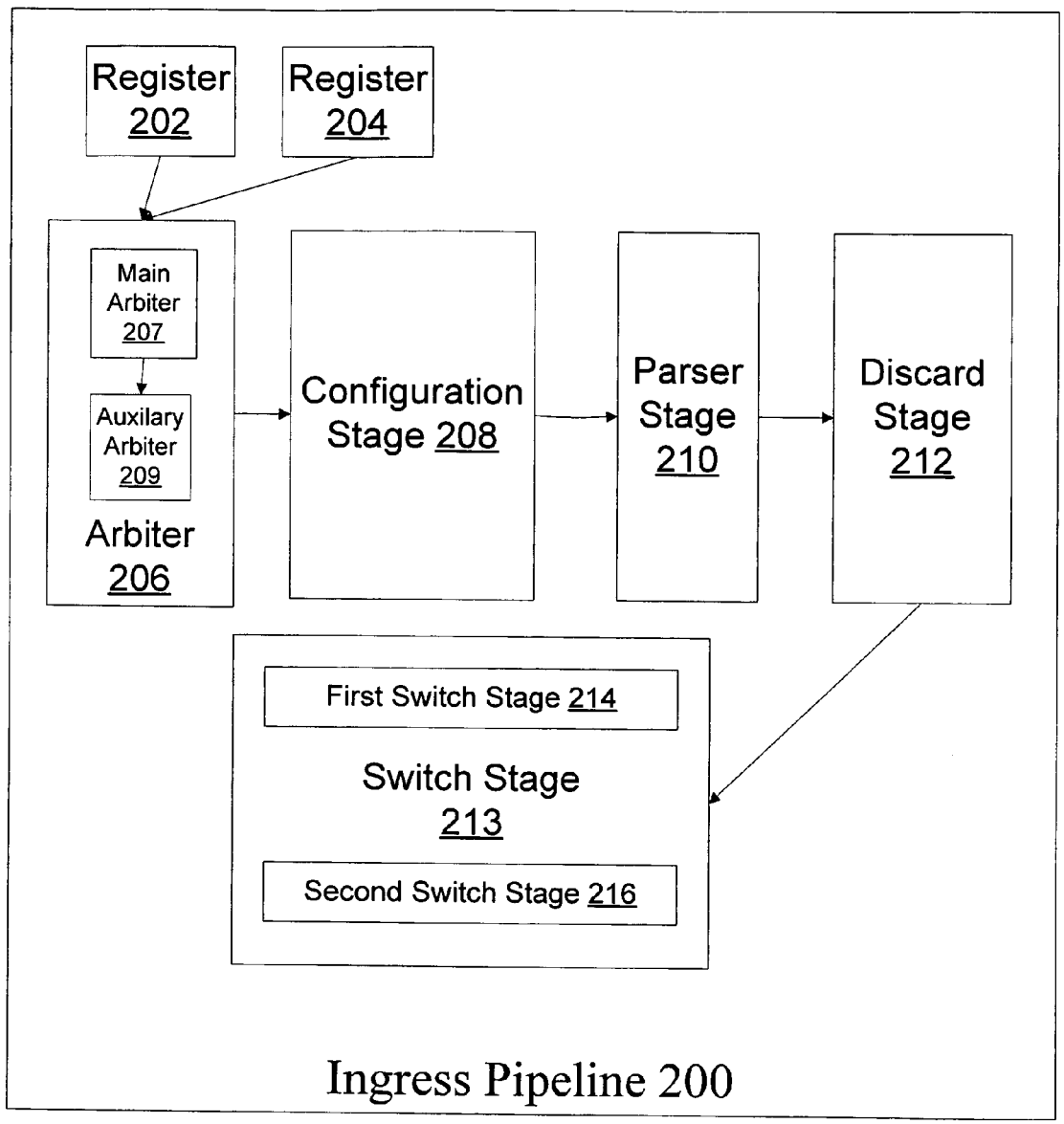
FIG. 2 illustrates a centralized ingress pipeline architecture.

FIG. 2 illustrates a centralized ingress pipeline architecture 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 2 10, a discard stage 2 12 and a switch stage 2 13. Ingress pipeline 200 receives data from the XBOD, GBOD or CPU processing module 111 and stores cell data in data holding register 202. Arbiter 206 (which includes a main arbiter 207 and an auxiliary arbiter 209) is responsible for scheduling requests from the GBOD, the XBOD and the CPU. Configuration stage 208 is used for setting up a table with all major port-specific fields that are required for switching. Parser stage 210 parses the incoming packet and a high speed module header, if present, handles tunneled packets through Layer 3 (L3) tunnel table lookups, generates user defined fields, verifies an Internet Protocol version 4 (IPv4) checksum on outer IPv4 header, performs address checks and prepares relevant fields for downstream lookup processing. Discard stage 212 looks for various early discard conditions and, if present, either drops the packet and/or prevents it from being sent through pipeline 200. Switching stage 213 performs all switch processing in ingress pipeline 200, including address resolution.

According to an embodiment of the invention, switching stage 213 includes a first switch stage 214 and a second switch stage 216. First switch stage 214 resolves any drop conditions, checks for layer 2 source station movement and resolves most of the destination processing for layer 2 and layer 3 unicast packets, layer 3 multicast packets and IP multicast packets. The first switch stage 2 14 also performs protocol packet control switching by optionally copying different types of protocol packets to the CPU or dropping them. The first switch stage 214 further performs all source address checks and determines if the layer 2 entry needs to get learned or re-learned for station movement cases. The first switch stage 2 14 further performs destination calls to determine how to switch packets based on a destination switching information. Specifically, the first switch stage 214 figures out the destination port for unicast packets or port bitmap of multicast packets, calculates a new priority, optionally traps packets to the CPU and drops packets for various error conditions. The first switch stage 214 further handles high speed switch processing separate from switch processing from port 109a-109x and switches the incoming high speed packet based on a stage header operation code. After first switch stage 214 processes the packet, a destination port bitmap is produced for multicast packets and a unicast port/trunk identifier is transmitted to later stages for unicast packets.

Figure 3:
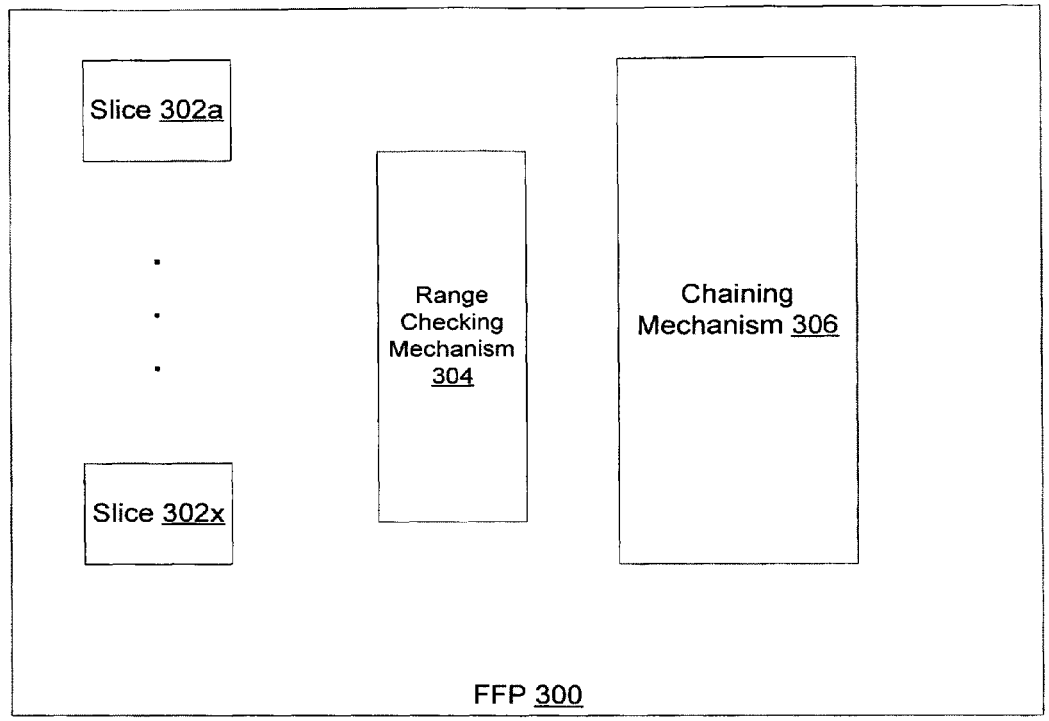
FIG. 3 illustrates a fast filter processor implemented in an embodiment of the invention.

A fast filter processor (FFP) then filters the packet based primarily on fields from the packet. In an embodiment of the invention, all packets received by switched or non-switched ports use a single instantiation of the FFP which includes a filter mechanism based primarily on fields in the packet instead of bytes from the packet. FIG. 3 illustrates the fast filter processor implemented in an embodiment of the invention. FFP 300 includes a number of slices 302a-302x for classifying packets and generating actions based on that classification, at least one range checking mechanism 304 for performing range checks on source and destination port numbers and a chaining mechanism 306 for increasing the amount of data that is used to determine a match by FFP 300. In an embodiment of the invention, FFP 300 processes a packet every clock cycle, and therefore has enough bandwidth with a 133 MHz clock to support 4 GE ports and 4-10 GE ports or 12 Gbps high speed ports at the same time.

Figure 4:
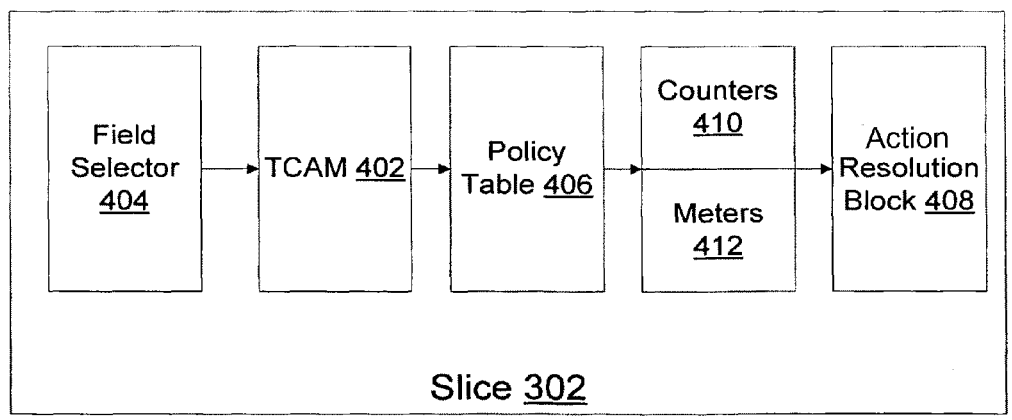
FIG. 4 illustrates a slice implemented in an embodiment of the invention.

FIG. 4 further illustrates a slice 302 implemented in an embodiment of the invention. According to an embodiment of the invention, FFP 300 may include up to 16 slices 302, that each operates on a field selection approach, wherein specific fields are parsed from an incoming packet and applied to a Ternary Content Addressable Memory (TCAM), described below. Specifically, each of slices 302 includes a TCAM 402, field selectors 404 and a policy table 406. Multiple slices 302 may also share one action resolution block 408. Each slice 302 may also include one group of counters 410 and one group of meters 412. It should be noted that the number of slices 302 and the number of entries per slice 302 has no effect on the performance of FFP 300. It should also be noted that each slice 302 is an independent searching mechanism that is capable of creating actions and updating meters 412 and counters 410. So if in an embodiment, there are 16 slices 302, there would be 16 separate filters running in parallel. It is therefore possible to generate 16 matches per packet along with 16 meter updates and 16 counter updates. FFP 300 merges actions from all slices 302 and passes the packet along for further processing.

As mentioned above, each slice 302 uses an associated TCAM 402 for classifying the packets. TCAM 402 is a memory with insertion and deletion support that compares a primary input bus, which in one embodiment is the width of the memory, with all of its entries and outputs an address for a matched entry. TCAM 402 has a mask of each memory entry to enable selection of bits, in each entry, that are required to match exactly with the bits from the primary input bus to determine a match. If there is more than one match, TCAM 402 prioritizes multiple matches based on the address of the match. Software associated with slice 302 prioritizes the entries in TCAM 402 appropriately. In an embodiment, the entry with the lowest physical address is assigned the highest priority. In an embodiment, there are 2 K entries in TCAM 402. Thus, there are 2 K masks in FFP 300.

When a packet is processed by the ingress pipeline, parser 210 may parse standard Ethernet fields and/or user defined fields. For example, the parser may parse a 48 bit destination MAC address, a 48 bit source MAC address, a 16 bit Ethernet Type, a 16 bit outer VLAN tag, a 16 bit inner VLAN tag, a 32 bit Destination IPv4 address, a 32 bit source IPv4 address, a 128 bit destination IPv6 address, a 128 bit source IPv6 address, a 8 bit IP protocol, a 2 bit IP flag, a 6 bit TCP flag, IPv6 fields, a 16 bit destination TCP/UDP port, a 16 bit source TCP/UDP port and a 8bit DSCP field. Parser 210 may also extract fields from the packet and insert the fields in other user defined fields. According to an embodiment, two user defined fields may also be parsed by parser 210. Each of the user defined fields is 128 bits in width and is made of any four groups of four contiguous bytes from the first 128 bytes of the packet. When the packet reaches FFP 300, field selector 404 may also obtain other fields that do not come directly from the packet. These fields may be used to indicate what happened to the packet in previous stages of the ingress pipeline. For example, the source port, source module identifier, a destination port, destination module identifier, a lookup status, packet format information, IP information including other information about the packet, packet resolution information, and module header option codes may be applied by FFP 300.

Given the number of combinations of the information entering FFP 300, an embodiment of the invention divides the fields applied to each slice 302 into three sections. According to an embodiment of the invention, each TCAM entry includes a format which includes a 32 bit first-field-section, a 128 bit second-field-section, a 16 bit third-field-section, a Input Port Bit Map (IPBM) select bit, a 5 bit source port number, a high speed packet bit and a 2 bit valid field. The first-field-section, second-field-section, and third-field-section include multiple values, each of which defines associated information. The IPBM select bit indicates that the first-field-section is programmed to used an IPBM field as an input; the high speed packet bit indicates whether or not the packet is a high speed packet; the source port number is used to match which port a particular TCAM entry is programmed for; and the valid field indicates if the entry is valid and should be used for comparison. Each port has a selector 404 for the first-field-section, the second-field-section and the third-field-section on a per slice basis.

Figure 5:
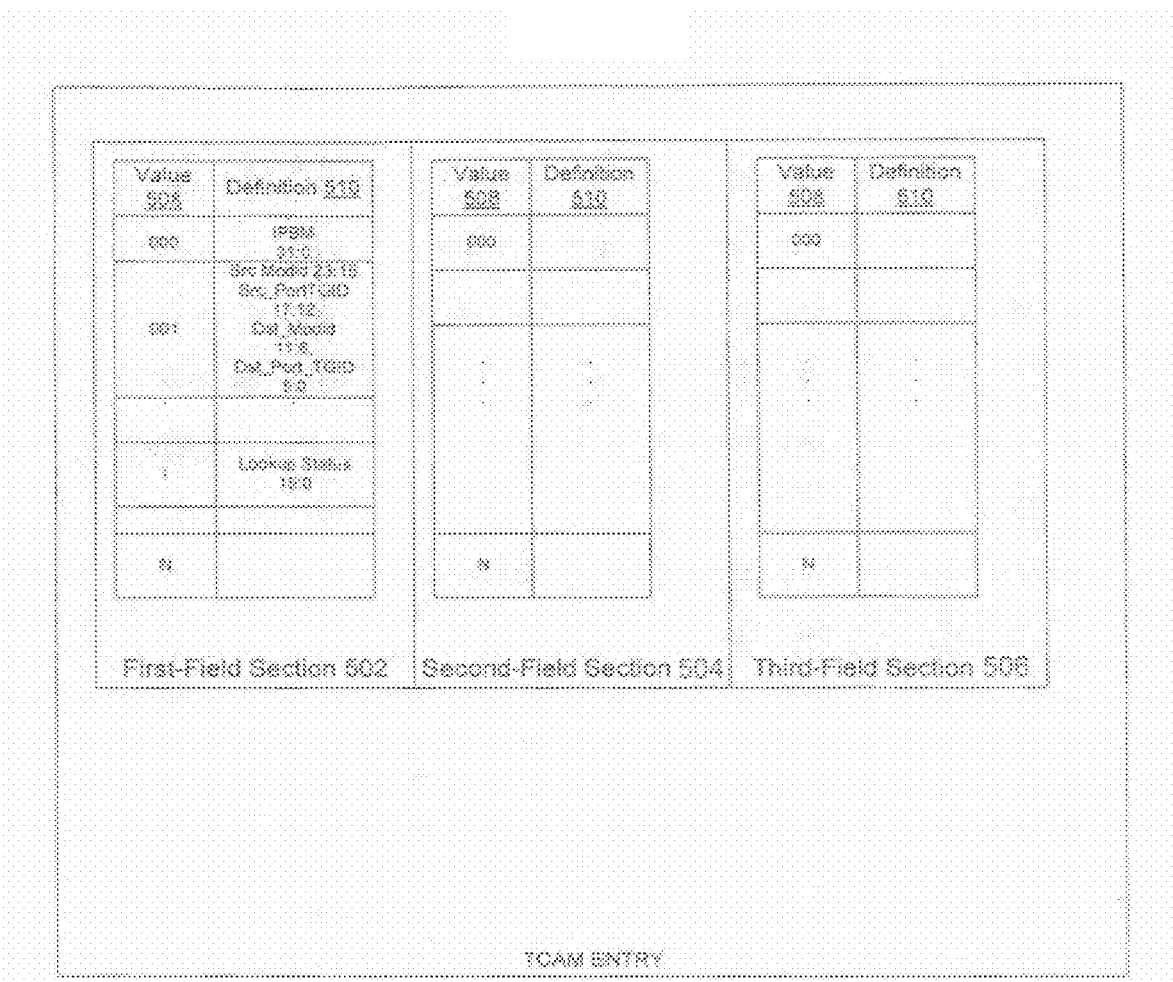
FIG. 5 illustrates a first-field-section, a second-field-section, and a third-field-section implemented in a TCAM entry in an embodiment of the invention.

FIG. 5 illustrates first-field-section 502, second-field-section 504, and third-field-section 506 implemented in a TCAM entry in an embodiment of the invention. According to FIG. 5, each of the first-field-section 502, second-field-section 504, and third-field-section 506 include multiple value fields 508 and multiple definition fields 510. For example, the first value field 508 of first-field-section 502 indicates that the first 32 bits of first-field-section 502 are to be used for the IPBM field; and the second value field 508 of first-field-section 502 indicates that the first 6 bits store the destination port trunk group ID, the next 6 bits store the destination module ID, the next 6 bits store the source port trunk group ID, the next 6 bits store the source module ID. Thus, if the second value field 508 of first-field-section 502 is used, the information stored in the bits identified by the second value is selected for that slice. Value field 508i of first-field-section 502 indicates that the first 16 bits of first-field-section 502 are to be used to determine a lookup status.

The IPBM field of first-field-section 502 provides an additional global mask to be applied to selected TCAM entries. According to this mechanism, the global mask is created wherein only 1 bit is set for a port. The global mask is ANDed with associated masks in the TCAM entry and outputs an OR of the data in the entry. Therefore, the global mask enables the selection of any bit of the data that has an associated match In an embodiment, the user may program first-field-section 502 of a TCAM entry for ports, for example ports 0, 1, 4, and 10, that are allowed to match on a specific rule. FPP 300 will then ensure that only those ports do indeed match on that rule by logically ANDing the new global mask with the associated mask bits of the TCAM entry. If, thereafter, the user sets the IPBM select bit, then the global mask is applied to the associated TCAM entry. This mechanism of the present invention thus allows for multiple ports to share a rule within a TCAM entry.

When the user chooses to use the first-field-section's 502 IPBM value, the source port number field and other fields are masked off within the TCAM entry. This ensures that only the first-field-section's IPBM is used to pick the source ports available for matching. For example, if entry 0 uses the first-field-section 502 IPBM for ports 0, 1, 4, and 10, this entry masks off the other fields so that they are not considered as part of the comparison. The bits for ports 0, 1, 4, and 10 are set in the associated entry mask. When a packet enters from one of ports 0, 1, 4, and 10, the global mask is ANDed with the mask of the entry. So if the packet entered on port 1, only the bit for port 1 will be set in the global mask. When the global mask is ANDed with the entry mask, a new mask is created, wherein only the bit associated with port 1 is set. Thereafter, the new mask is used to select the appropriate data bit for a match. By ANDing the global mask with the entry mask, the present invention enables the selection of any one of a set of data entries.

Returning to FIG. 4, policy table 406 is used to store actions associated with a match from TCAM 402. Policy table 406 includes one entry for each entry of TCAM 402 and the associated entry in policy table 406 includes all of the actions associated with the TCAM entry. In one embodiment, there are four types of actions associated with policy table 406. A profile ID indicates profile independent action bits, wherein a red profile field indicates red profile action bits, a yellow profile field indicates yellow profile action bits and a green profile field indicates green profile action bits. All other action bits are considered as green profile bits. Based on the action bits in policy table 406, device 100 may drop, replace, redirect, apply an egress mask and/or copy information to the CPU.

One embodiment of the invention also includes 128 meters 412 for each slice 302. Meters 412 are divided into 64 even meters and 64 odd meters, wherein index, test, and update fields are provided, in policy table 406, for each set of meters 412. A meter index field indicates which meter is used for testing and/or for updating from the set of 128 meters. The meter index field is used for default, flow, and color modes of operation. If the default mode is selected, the packet is determined to be green and no actual bucket updates occur. The flow mode is a normal mode in which all selected buckets must be in profile for the packet to be considered in profile. A color blind mode determines the color of an incoming packet only based on the profile status of each bucket. A color aware mode determines the color of an incoming packet based on the profile status of each bucket and the incoming color of the packet. The test and update bits are only used for the flow mode. The test bit indicates that the meter should be considered when determining the profile status or color of the packet. The update bit indicates that the meter should be updated based on the color of the packet. In the flow mode, all meters that are tested by the test bit must be in-profile for the packet to be determined to be green or else the packet is read. If the packet is determined to be green, then all meters whose update bit is on will be updated. If the mode is a flow mode, at least one of the meters must be selected by the test bit. Multiple policy table entries may point to the same meter indices, wherein one entry could be using two meters in one mode and the second entry could by using two meters in a different mode.

One embodiment of the invention includes 128 counters 410 for each slice 302. Each counter is 32 bits wide. Policy table 406 includes a counter index field and a counter mode field that control the updates of counters 410. Full match in each slice 302 may be capable of updating one counter 410 in a counter pair. Policy table 406 fields indicate which counter to update and how to update the counter. The counter index indicates which counter pair to use, wherein the counter pair includes an upper counter and a lower counter.

FFP 300 includes a chaining mechanism 306 for increasing the amount of data that is used to determine a full match. In each slice, there is a key extraction unit for selecting the key on which to match. To extend the key on which to match, any entry in policy table 406 can be set to chain. However, in an embodiment, only an even/odd slice pair can be used to extend the matching data. As such, an entry in slice N may only be chained with an entry in slice N+1. When a TCAM entry matches against the input key, the TCAM outputs the entry number and the hit bit and policy table 406 is read to determine if a chain bit is set. If both the TCAM entries in an even/odd pair, such as slice 0 and slice 1, find matches and both have their chain bit set in the respective policy table entries, then the two slices are potentially chained. To determine if the slices are to be chained, a determination of which entry in the even numbered slice is selected or allowed to be chained with the entry in the odd numbered slice is made. The mechanism to control which entry in an even numbered slice is allowed to chain with an entry in the odd numbered slice is to re-use or overlay bits in policy table 406 entry for the odd numbered slice, if a chain bit is set in that entry. There are 8 overlay bits that include a valid bit and a 7 bit index which indicates which entry in the even numbered slice is allowed to be chained with that entry in the odd numbered slice. For example, the 7 bit index in entries 0-5 of slice 0 could direct chaining with a same entry of slice 1. This allows for a one-to-many or many-to-one chaining relationship.

Figure 6:
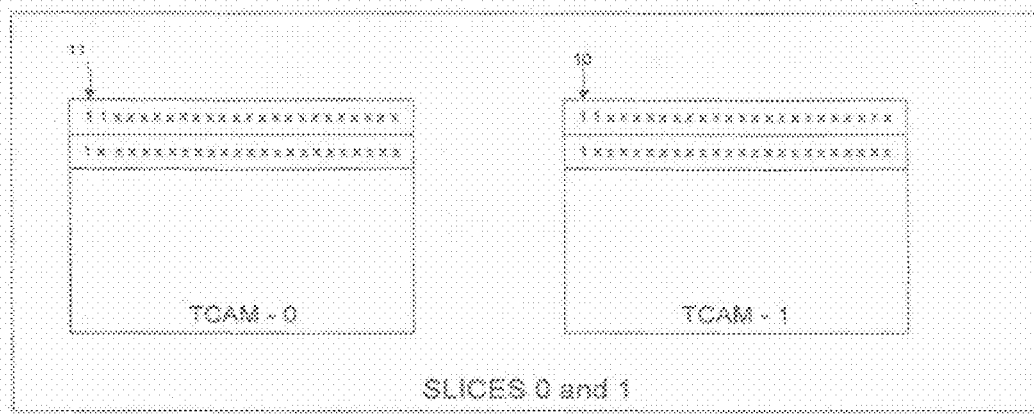
FIG. 6 illustrates two slices used in an embodiment of the invention.

The problem with this approach is that if the one of the entries to be chained is a subset of the other entry, the matches may not be accurate. So for example, consider the slice 0 and slice 1 illustrated by FIG. 6. Slice 0 includes a TCAM 0 with two entries and slice 1 includes a TCAM 1 with two entries. If the key entering TCAM 0 is 11 and the key entering TCAM 1 is 10, the first entry of slice 0 would hit, the second entry of slice 0 would miss, and the first and second entries of slice 1 would miss. The problem is the second entries of slices 0 and 1 should have also produced a hit. If the two entries are to be considered as one entry, the customer would have expected the second entry of slices 0 and 1 to provide a match. But since the second entries of TCAMs 0 and 1 did not match, the subset match would not work properly. Thus, the present invention enables the TCAM 0 to output up to 128 hit bits that are ANDed with the hit bits from TCAM 1 and applied to a priority encoder for determining the appropriate hit and entry. So from TCAM 0, there would be a hit bit from entries 0 and 1 and from TCAM 1, there would be a hit bit from only entry 1. The priority encoder will then select entries 1 from TCAMs 0 and 1 since both those entries provided a hit bit.

As shown in FIG. 3, an embodiment of the network device also includes a mechanism 304, separate from the TCAMs and slices in FFP 300, for performing range checking on source and destination UDP port numbers. In this embodiment, FFP 300 includes multiple range checkers 304, each with a data structure that includes a 16 bit lower bounds field, a 16 bit upper bounds field, an enable bit, and a source destination select bit. The lower bounds and upper bounds fields define the range within which the value of the selected port number must fall. For example, if the lower bounds field is programmed to one and the upper bounds field is programmed to 10, then the range checker will produce a match if the selected port number has a value including one or ten and any number between one and ten. The enable bit indicates if the range checker is turned on and the source destination select bit determines if the range checker is checking a source UPD port number or a destination UDP port number. The results from each of the 16 range checkers may then be selected as one of the sets of inputs to TCAMs 402. Thus, the range checker may be used as part of a classification mechanism. It should be noted that more range checking can be accomplished via TCAM 402, because the mask associated with each rule makes it possible to create multiple entries for defining a range.

Figure 7:
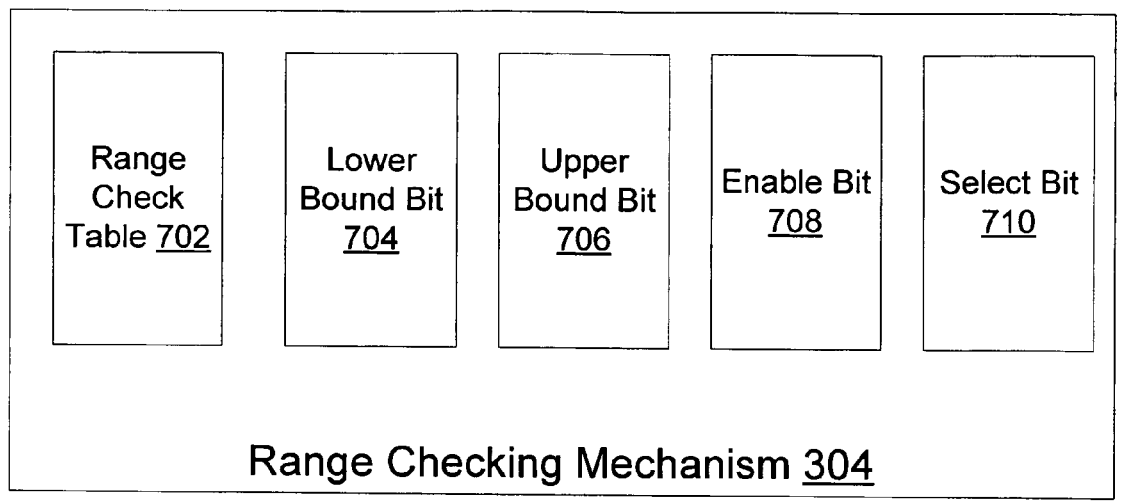
FIG. 7 illustrates a range checking mechanism implemented in a Fast Filter Processor.

FIG. 7 illustrates range checking mechanism 304 implemented in FFP 300. Range checking mechanism 304 is associated with range check table 702 with 16 entries, each of which includes a 16 bit lower bound 704, a 16 bit upper bound 706, an enable bit 708 and a source-destination select bit 710. Lower and upper bound 704 and 706 define a range within which the value of a selected port number must fall. Enable bit 708 indicates if range checker 304 is on and source-destination select bit 710 determines if range checker 304 is checking a source or destination UDP port number. According to an embodiment, FFP 300 includes 16 range checkers 304. Results from each range checker 304 may be selected as one of the sets of inputs to a TCAM 402. As such, range checker 304 is part of the classification mechanism.

Returning to FIG. 2, second switch stage 216 then performs FFP action resolution, source port removal, trunk resolution, high speed trunking, port blocking, CPU priority processing, end-to-end Head of Line (HOL) resource check, resource check, mirroring and maximum transfer length (MTU) checks for verifying that the size of incoming/outgoing packets is below a maximum transfer length. The second switch stage 216 takes first switch stage 216 switching decision, any layer routing information and FP redirection to produce a final destination for switching. The second switch stage 216 also removes the source port from the destination port bitmap and performs trunk resolution processing for resolving the trunking for the destination port for unicast packets, the ingress mirror-to-port and the egress mirror-to-port. The second switch stage 216 also performs high speed trunking by checking if the source port is part of a high speed trunk group and, if it is, removing all ports of the source high speed trunk group. The second switch stage 216 further performs port blocking by performing masking for a variety of reasons, including meshing and egress masking.

Upon processing the packet it is delivered to MMU 104 which forwards the packet to egress module 106. Upon receiving the packet from MMU 104, egress module 106 supports multiple egress functions for a 72 gigabyte port bandwidth and a CPU processing bandwidth. According to an embodiment, egress module 106 is capable of handling more than 72 Gig of traffic, i.e., 24 one GE port, 4 high speed ports (12G) and a CPU processing port of 0.2GE. Egress module 106 receives original packets, as inputted from Ethernet ports 109a-109x, from MMU 104, and may either transmit modified or unmodified packets to destination ports 109a-109x. According to one embodiment of the invention, all packet modifications with device 100 are made in egress module 106 and the core processing of egress module 106 is capable of running faster than the processing of destination ports 109a-109x. Therefore, egress module 106 provides a stall mechanism on a port basis to prevent ports 109a-109x from becoming overloaded and thus services each port based on the speed of the port.

In an embodiment of the invention, egress module 106 is connected to MMU 104 by a 1024 bit data interface and all packets transmitted from MMU 104 pass through egress module 106. Specifically, MMU 104 passes unmodified packet data and control information to egress module 106. The control information includes the results of table lookups and switching decisions made in ingress module 102. The data bus from MMU 106 is shared across all ports 108 and 109 and the CPU processing 111. As such, the bus uses a "request based" TDM scheme, wherein each Gig port has a turn on the bus every 72 cycles and each high speed port 108 has a turn every 6 cycles. CPU processing packet data is transmitted over bubbles - free spaces occurring on the bus. Upon receiving the information for MMU 104, egress module 106 parses the packet data, performs table lookups, executes switch logic, modifies, aligns and further buffers the packet before the data is transmitted to the appropriate destination port 109a-109x.

Egress module 106 is connected to CPU processing module 111 through a 32 bit S-bus interface which the CPU uses to send requests to egress module 106. The requests are typically for reading the egress module's resources, i.e., registers, memories and/or stat counters. Upon receiving a request, egress module 106 converts the request into a command and uses a mechanism, described in detail below, for storing and inserting CPU instructions into a pipeline wherever there is an available slot on the pipeline.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

With respect to the present invention, network devices may be any device that utilizes network data, and can include switches, routers, bridges, gateways or servers. In addition, while the above discussion specifically mentions the handling of packets, packets, in the context of the instant application, can include any sort of datagrams, data packets and cells, or any type of data exchanged between network devices.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A network device for routing packets, the network device comprising:
   a processor comprising a plurality of slices configured to classify packets and generate at least one action based on a classification of a packet,
   wherein each of the plurality of slices applies specific fields from the packet to an associated memory device that compares input to the memory device with entries in the memory device and outputs an address for a matched entry, wherein the memory device comprises a mask for each memory entry to enable selection of bits that are required to match exactly with bits from the input to the memory device, and
   wherein the specific fields include a plurality of fields some of which include multiple field values and definitions, an input bit map field of one of the plurality of fields being used to provide an additional global mask that is ANDed to associated masks in selected entries in the memory device thereby enabling the memory device to output an OR of the data in the selected entries and thereby allowing multiple ports to share a rule within a memory device entry.

2. The network device according to claim 1, wherein the network device is configured to parse an incoming packet on at least one of a standard field, a user defined field and another field that does not come from the packet, wherein the user defined field comprises contiguous bytes from predefined bytes in the incoming packet.

3. The network device according to claim 2, wherein the processor is configured to include up to 16 slices, wherein each slice is configured as an independent searching mechanism that is capable of performing one or more independent actions.

4. The network device according to claim 1, wherein the memory device is configured to prioritize multiple matches based on an address of each match.

5. The network device according to claim 1, wherein the memory device is configured to assign a highest priority to a match with a lowest physical address.

6. The network device according to claim 1, wherein when the input bit map field value is chosen, the processor is configured to mask off a plurality of other fields in the memory device entry, thereby ensuring that only the input bit map field is used to select source ports that are available for matching.

7. The network device according to claim 6, wherein when a packet enters from one of the selected source ports that are available for matching, the global mask is ANDed with a mask associated with an entry in the memory device that is associated with the selected port and a new mask is used to select appropriate data for a match.

8. The network device according to claim 1, wherein the device is configured such that each of the plurality of slices applies a match from the memory device to an associated entry in a table to apply actions associated with the packet, the table entry including four types of actions,
   wherein based on associated action bits and the table entry, the network device is configured to perform one of drop, replace, redirect or copy packet information.

9. The network device according to claim 1, wherein each of the plurality of slices further comprises at least one field selector for selecting fields that are applied to the memory device.

10. The network device according to claim 1, wherein the memory device comprises a storing unit configured to store groups of parsed fields in a predefined number of sections in each entry, wherein if a specific field in one of the predefined number of sections is selected, an extra mask is applied to the memory device.

11. The network device according to claim 1, wherein each of the plurality of slices comprises at least one meter configured to monitor packets, wherein bits associated with the meter are provided in a table.

12. The network device according to claim 1, wherein each of the plurality of slices comprises at least one counter.

13. The network device according to claim 1, wherein the processor comprises at least one range checking mechanism that comprises a range table configured to define a range within which a value of a selected port must fall.

14. The network device according to claim 13, wherein the processor is configured to apply results from the at least one range checking mechanism as input to the memory device.

15. The network device according to claim 1, wherein the processor comprises a chaining mechanism configured to increase an amount of data that is used to determine a full match in the memory device, wherein the chaining mechanism is implemented when there is a match in at least two of the plurality of slices, the chaining mechanism being used for enabling an entry of the memory device to output a predefined number of hit bits that are ANDed to hit bits of another entry of the memory device and applied to a priority encoder configured to determine an appropriate hit and entry.

16. The network device according to claim 15, wherein the device is configured such that each of the plurality of slices applies a match from the memory device to an associated entry in a table to apply actions associated with the packet, the table further comprising:
    a setting unit configured to set at least two entries to implement the chaining mechanism.

17. The network device according to claim 15, wherein the processor is configured to implement the chaining mechanism in an even memory device entry and an odd memory device entry, when the even memory device entry matches its associated input, the odd memory device entry matches its associated input, and associated chain bits are set.

18. A method for processing packets, the method comprising:
    applying specific fields from a packet to an associated memory device, wherein the specific fields include a plurality of fields some of which include multiple field values and definitions;
    comparing input to the memory device with entries in the memory device;
    enabling selection of bits, by the memory device, that are required to match exactly with bits from the input to the memory device;
    using an input bit map field of one of the plurality of fields to provide an additional global mask that is ANDed to associated masks in selected entries in the memory device; and
    enabling the memory device to output an OR of the data in the selected entries, thereby allowing multiple ports to share a rule within a memory device entry.

19. The method according to claim 18, further comprising applying results from at least one range checking mechanism as input to the memory device.

20. The method according to claim 18, further comprising applying a chaining mechanism for doubling an amount of data that is used to determine a full match in the memory device, wherein the chaining mechanism is implemented when there are two matches.

21. An apparatus for processing packets, the apparatus comprising:
    applying means for applying specific fields from a packet to an associated memory device, wherein the specific fields include a plurality of fields some of which include multiple field values and definitions;
    comparing means for comparing input to the memory device with entries in the memory device;
    enabling means for enabling selection of bits, by the memory device, that are required to match exactly with bits from the input to the memory device;
    means for using an input bit map field of one of the plurality of fields to provide an additional global mask that is ANDed to associated masks in selected entries in the memory device; and
    enabling means for enabling the memory device to output an OR of the data in the selected entries, thereby allowing multiple ports to share a rule within a memory device entry.

* * * * *